No. 628,242. Patented July 4, 1899.
D. GESSNER.
CLOTH PRESSING MACHINE.
(Application filed Oct. 4, 1898.)
(No Model.)
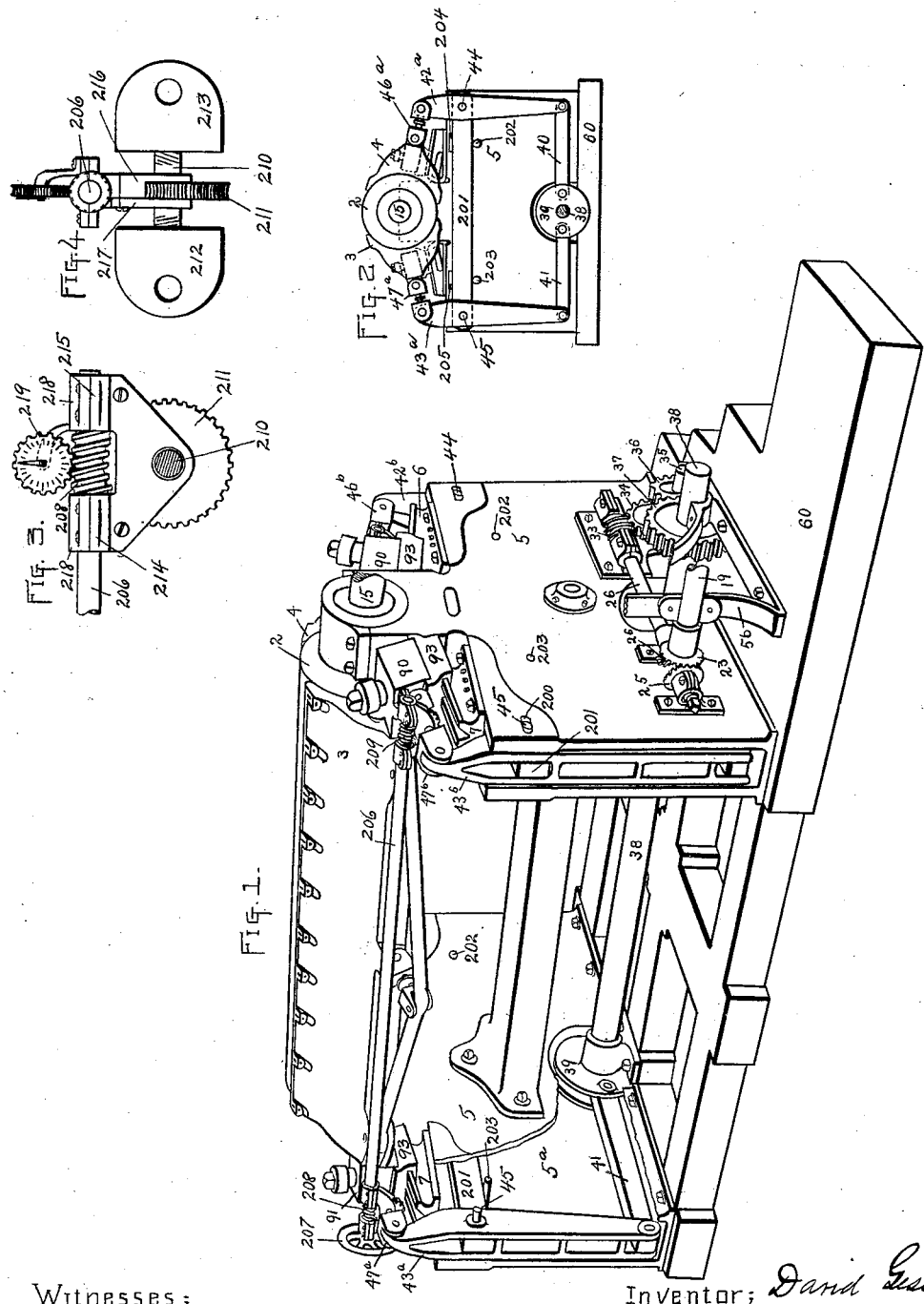
Witnesses:
J. E. Green
Fred S. Kemper
Inventor: David Gessner
by Gifford & Bull Att'ys.

UNITED STATES PATENT OFFICE.

DAVID GESSNER, OF WORCESTER, MASSACHUSETTS.

CLOTH-PRESSING MACHINE.

SPECIFICATION forming part of Letters Patent No. 628,242, dated July 4, 1899.

Application filed October 4, 1898. Serial No. 692,635. (No model.)

*To all whom it may concern:*

Be it known that I, DAVID GESSNER, a citizen of the United States, and a resident of Worcester, in the county of Worcester and State of Massachusetts, have invented certain new and useful Improvements in Cloth-Pressing Machines, of which the following is a specification.

This invention consists in an improvement applicable to the machine patented by me in United States Letters Patent No. 565,071, dated August 4, 1896, and No. 576,666, dated February 9, 1897. In the following description reference is made to said Patent No. 576,666 for a detailed description of any parts not herein fully shown and described.

One part of my invention consists in a means whereby a give-and-take motion may occur automatically with respect to the two bed-plates.

Another part of my invention consists in a modification of the mechanism whereby the adjustment of the bed-plates is effected relatively to the bed-plate-operating mechanism.

In the accompanying drawings, Figure 1 is an isometric view of sufficient of my machine to show wherein it differs from the machine described in said Patent No. 576,666, a portion of one of the end frames 5 being represented as broken away, so as to show the internal construction. Fig. 2 is a view to show the relationship of the cylinder, bed-plates, levers, and connections of the levers with each other and with the bed-plates and shaft 38, respectively. Figs. 3 and 4 are details.

In the accompanying drawings the same numerals are employed as in said Patent No. 576,666 for corresponding parts.

2 is the cylinder.

3 and 4 are the bed-plates.

5 5 are the end frames, each of which is preferably made of two members, with a space $5^a$ between to receive the levers $42^a$, $43^a$, $42^b$, and $43^b$ for operating the ends of the bed-plates.

15 is the cylinder-shaft, driven by any suitable means. (Not shown.)

38 is the bed-plate-operating shaft, driven by any suitable means. (Not wholly shown.)

19, 23, 25, 26, 33, 34, 35, 36, and 37 are parts involved in the train of mechanism shown and described fully in said Patent No. 576,666 for operating the shaft 38.

90 and 91 are projections from the ends of the bed-plates, to which the links $46^a$, $46^b$, $47^a$, and $47^b$ are shackled. The bed-plate projections rest upon carriages 93, mounted on guideways 6 and 7, attached to each of the frames 5.

60 is a bed-plate upon which are secured the upright frames 5 and 5 and 56.

From any suitable prime mover the cylinder is driven, and the bed-plates are reciprocated by chains of mechanism the same as the chains of mechanism shown and described in said Patent No. 576,666, and the bed-plates are constructed and supported as shown and described in said patent; also, as described in said Patent No. 576,666, the shaft 38 is provided with the heads 39 at diametrically opposite points, on each of which are pivoted the links 40 and 41, pivoted to the levers $42^a$ and $43^a$, which bear against the bed-plates through the links $46^a$ and $47^a$.

Instead of having the lever-fulcrums 44 and 45 mounted in fixed bearings in the boxed frame 5, as described in said Patent No. 576,666, the holes 200, bored in said frame 5 to receive the ends of said fulcrum-pins 44 and 45, are made oblong, as shown in Fig. 1, so as to permit of a limited amount of play of the fulcrum-pins to and from the cylinder-shaft 15, or the pins may be cut off, so as not to extend into the holes 200.

For the support of the fulcrum-pins 44 and 45 I provide a fulcrum-bar 201, of heavy steel, extending horizontally inside of the boxed frame from the lever $42^a$ to the lever $43^a$. This fulcrum-bar may rest on the pins 202 and 203, fixed to the frame 5, so that said bar is free to slide between said pins and the planed surfaces 204 and 205 on the frame above said bar. The pins 44 and 45 serve to fulcrum the levers $42^a$ and $43^a$ on opposite ends of said fulcrum-bar 201, and by the sliding of said bar 201 the fulcrums of the two levers may move relatively to the cylinder-shaft 15, which has bearings fixed to the frame 5. Nevertheless, any such movement of one of the fulcrums must be accompanied by a corresponding movement of the other fulcrum, so as to produce a give-and-take motion between the two relatively to the fixed cylinder-bearings.

As a result of the above construction, although the shafts 15 and 38 are in fixed bearings, any slight variation in the adjustment of the links, as 46ª, connecting one of the bed-plates with its levers, will be automatically distributed between the two bed-plates relatively to the cylinder by the sliding of the fulcrum-bar 201, so that the pressure of the one bed-plate will be maintained substantially equal to that of the other.

For adjusting the front bed-plate 3 the following mechanism is provided:

206 is a shaft carrying the hand-wheel 207 and the worms 208 and 209. This shaft extends from the link 47ª at one end of the bed-plate to the link 47ᵇ at the opposite end thereof and is provided with a similar connection for its support on and for its operation of the adjusting-screw 210 in each link, a description of one of which connections will suffice for both.

211 is a worm-wheel fixed to the adjusting-screw 210 and gearing with the worm 208, so that the turning of the shaft 206 will cause an adjustment of the distance between the heads 212 and 213 of the link 47ª, one of which heads is coupled to the lever and the other to the bed-plate. In order that this adjustment shall not affect the position of the shaft 206, the shaft is mounted on the screw 210, so as to maintain its position independently of the variations in the positions of the heads 212 and 213, as follows: A triangular bracket contains the bearings 214 and 215 for the shaft 206 at opposite ends of the worm 208. It also contains a plate 216, extending down on one side of the worm-wheel 211, and another plate 217, detachable from the first plate and extending down on the opposite side of the worm-wheel 211. The adjusting-screw 210 passes through these plates, so that said plates ride upon said set-screw.

By the above construction both ends of the front bed-plate are adjusted simultaneously from the same shaft and to a corresponding extent. The shaft is carried by the two set-screws, and therefore its position is not affected by the adjustment which it produces. By the removal of the bearing-caps 218 the shaft may be lifted out and the shackles thrown back.

A wheel 219, gearing with the worm 208, may be employed for indicating the amount of gearing adjustment to the operator. This amount of adjustment will by the operation of the sliding fulcrum-bar 201, already described, be automatically equally divided between the two bed-plates. The rear bed-plate will therefore seldom, if ever, require any adjustment, and its shackles 46ª and 46ᵇ may be constructed as shown in said Patent No. 576,666.

I have shown the fulcrum-rods 201 as sliding in a horizontal plane, which I deem to be the preferable construction; but I do not wish to limit myself to having them move in a plane, since I am aware that their movement may depart from a horizontal plane while still enabling them to perform their function of fulcrum coupling members moving transversely with respect to the bearings of the cylinder.

I claim—

1. In a cloth-pressing machine, in combination, a cylinder, two bed-plates, fixed bearings for said cylinder, guideways for the support of said bed-plates, bed-plate-operating levers and longitudinally-moving fulcrum-rods connecting the fulcrums of opposite levers, substantially as described.

2. In a cloth-pressing machine, in combination, a cylinder, two bed-plates, fixed bearings for said cylinder, guideways for the support of said bed-plates, bed-plate-operating levers and fulcrum coupling members movable transversely with respect to the fixed bearings of said cylinder whereby the fulcrums of opposite levers are coupled together, substantially as described.

3. In a cloth-pressing machine, in combination, the cylinder, the bed-plates, the power-shaft 38, the cylinder-shaft 15, fixed bearings for said shaft 38, reciprocating fulcrum-bars 201 extending across between said shafts, levers fulcrumed at opposite ends of said bars, mechanism whereby the ends of said levers are connected respectively with said shaft 38 and said bed-plates; whereby the sliding of said fulcrum-bars produces an automatic equalization of the adjustment of said bed-plates, substantially as described.

4. In a cloth-pressing machine, in combination, the cylinder, two bed-plates, an upright boxed frame member carrying supports for one end of the cylinder and bed-plates, bed-plate-operating levers extending within said boxed frame member and a bar extending within said boxed frame member and coupling the fulcrums of opposite levers, substantially as described.

5. In a cloth-pressing machine, in combination, the cylinder, two bed-plates, an upright boxed frame member carrying supports for one end of the cylinder and bed-plates, bed-plate-operating levers extending within said boxed frame member, a bar coupling the fulcrums of opposite levers and rests mounted upon said frame member whereon said bar is free to move relatively to the frame, substantially as described.

6. In a cloth-pressing machine, in combination, a cylinder, a bed-plate, bed-plate-operating levers, shackles containing adjusting-screws whereby said levers are coupled to said bed-plate, a worm-shaft 206, a worm-wheel fixed to each of said adjusting-screws and a carriage mounted on each of said adjusting-screws containing bearings for said worm-shaft, substantially as described.

7. In a cloth-pressing machine, in combination, a cylinder, bearings for the same, bed-plates, bed-plate-operating levers, shackles containing adjusting-screws coupling said levers with said bed-plates, a shaft 206, means whereby the movement of said shaft controls both the set-screws of one of said bed-plates and moving fulcrum-bars whereby the lever-fulcrums of opposite bed-plates are coupled together; whereby the adjustment by said shaft of one bed-plate is automatically distributed between the two, substantially as described.

8. In a cloth-pressing machine, in combination, a cylinder, two bed-plates, levers whereby said bed-plates are moved toward and away from each other, a member connecting the fulcrums of said levers; said member being longitudinally movable whereby the pressure of said bed-plates is automatically equalized, substantially as described.

9. In a cloth-pressing machine, in combination, a cylinder, two bed-plates, levers whereby said bed-plates are moved toward and away from each other, guideways for the support of said bed-plates, a member connecting the fulcrums of said levers; said member being longitudinally movable whereby the pressure of said bed-plates is automatically equalized, substantially as described.

Signed at Worcester, in the county of Worcester and State of Massachusetts, this 29th day of September, A. D. 1898.

DAVID GESSNER.

Witnesses:
   J. P. BRAWNER,
   WM. G. STRONG.